United States Patent
Bunker et al.

(10) Patent No.: US 10,178,182 B2
(45) Date of Patent: Jan. 8, 2019

(54) SIGNAL CLONING

(71) Applicant: Vivint, Inc., Provo, UT (US)

(72) Inventors: Brandon Bunker, Highland, CT (US);
Rongbin Lanny Lin, Orem, UT (US);
Shiwei Liu, Draper, UT (US)

(73) Assignee: Vivint, Inc., Provo, UT (US)

( * ) Notice: Subject to any disclaimer, the term of this patent is extended or adjusted under 35 U.S.C. 154(b) by 261 days.

(21) Appl. No.: 14/552,450

(22) Filed: Nov. 24, 2014

(65) Prior Publication Data

US 2016/0149749 A1  May 26, 2016

(51) Int. Cl.
| | |
|---|---|
| G06F 15/16 | (2006.01) |
| H04L 29/08 | (2006.01) |
| H04L 12/28 | (2006.01) |
| H04W 4/80 | (2018.01) |
| H04L 29/06 | (2006.01) |
| H04W 12/04 | (2009.01) |
| H04L 29/12 | (2006.01) |
| H04W 84/18 | (2009.01) |

(52) U.S. Cl.
CPC .......... *H04L 67/141* (2013.01); *H04L 12/282* (2013.01); *H04L 12/2825* (2013.01); *H04L 63/08* (2013.01); *H04L 67/12* (2013.01); *H04W 4/80* (2018.02); *H04W 12/04* (2013.01); *H04L 61/6022* (2013.01); *H04L 63/18* (2013.01); *H04L 2012/2841* (2013.01); *H04W 84/18* (2013.01)

(58) Field of Classification Search
CPC .......... H04M 1/7253; H04M 2250/02; H04W 84/18; H04W 76/02; H04W 88/06; H04W 4/008; H04B 5/00; H04B 5/02; H04L 41/0206; H04L 12/282; H04L 12/2825; H04L 61/6022; H04L 63/083; H04L 67/12; H04L 67/141; H04L 2012/2841
USPC .......................................................... 709/217
See application file for complete search history.

(56) References Cited

U.S. PATENT DOCUMENTS

| | | | |
|---|---|---|---|
| 7,376,746 B2 * | 5/2008 | Shinohara ............. | G06F 9/5055 709/221 |
| 7,706,750 B2 | 4/2010 | Dandekar et al. | |
| 2004/0177146 A1 * | 9/2004 | Ishiyama ................ | H04L 29/06 709/226 |
| 2004/0248514 A1 * | 12/2004 | Idani ................... | H04W 76/023 455/41.2 |
| 2008/0228865 A1 * | 9/2008 | Cruzada .................. | H04L 67/10 709/203 |

(Continued)

OTHER PUBLICATIONS

Piyare et al., Bluetooth Based Home Automation System Using Cell PHone, IEEE 15th International Symposium on Consumer Electronics, 2011.

*Primary Examiner* — Sm A Rahman
(74) *Attorney, Agent, or Firm* — Holland & Hart LLP

(57) ABSTRACT

Systems, apparatuses, and methods relating to security and/or automation systems are described. In one embodiment, a method may include receiving linking information from a first device by a second device, linking the second device with the first device via a first connection, the linking based at least in part on the linking information, storing at least a portion of the linking information, and transmitting the stored linking information from the second device to one or more other devices via a second connection.

20 Claims, 12 Drawing Sheets

(56) References Cited

U.S. PATENT DOCUMENTS

| | | | |
|---|---|---|---|
| 2010/0027444 A1* | 2/2010 | Lin .................. | H04W 12/08 |
| | | | 370/254 |
| 2010/0165216 A1* | 7/2010 | Beals ................ | H04N 5/4403 |
| | | | 348/734 |
| 2012/0137011 A1* | 5/2012 | Yoon ................ | H04L 29/12528 |
| | | | 709/228 |
| 2012/0165006 A1* | 6/2012 | Ge .................... | H04W 88/04 |
| | | | 455/423 |
| 2014/0098247 A1 | 4/2014 | Rao et al. | |
| 2014/0169599 A1 | 6/2014 | Solum et al. | |
| 2014/0176310 A1 | 6/2014 | Kotlicki | |

* cited by examiner

SIGNAL CLONING

BACKGROUND

The present disclosure generally relates to security and/or automation systems, and more particularly to methods for cloning one or more signals, characteristics, and/or connections, which may include transmitting certain information about one or more signals, characteristics, and/or connections to one or more other devices.

Security and automation systems are widely deployed to provide various types of communication and functional features such as monitoring, communication, notification, and/or other functions. These systems may be capable of supporting communication with a user through a communication connection and/or a system management action.

Current systems require users to carry physical keys and/or use a pin code to enter a structure, such as a home. But these keys and pin codes can be burdensome, be lost, lead to forgotten keypad codes, lead to difficulty activating the keypad, lead to mechanical or electrical malfunctions, and/or entry by an inappropriate party who gained access to the key or the keypad code—among other problems.

In addition, current systems require certain types of connections to provide a secure connection between two devices. For example, Bluetooth technology may provide some advantages over other connection types because of its rotating frequency. But this technology has distinct drawbacks, including requiring one-to-one pairing that becomes extremely complicated, unwieldy, and burdensome on users—particularly with complex home security and/or automation applications.

SUMMARY

In many cases, one-to-one pairing becomes extremely complicated, unwieldy, and burdensome on users—particularly with home security and/or automation applications. In some cases a home, for example, may have 4 main users each having a short range wireless communication protocol device (e.g., a Bluetooth device, a near field communication (NFC) device, etc.) and 10 in-home short range wireless communication protocol devices (e.g., Bluetooth-enabled devices, NFC devices, etc.). Current systems would require at least 40 connections (each of the 4 users having 10 connections or more) leading to extremely complicated and difficult to manage systems.

The proposed solutions include, among other things, cloning a signal, a characteristic, and/or a connection, and transmitting at least some of the relevant information relating to the signal, the characteristic, and/or the connection to other devices. This reduces any requirement for numerous one-to-one connections, while also expanding the functionality of the system at least by enabling these other devices to perform additional functions and/or communicate in ways they otherwise would not be able to. In addition, the present systems and methods may provide additional functionality including relative location-based automation and features.

According to at least one embodiment, a method for security and/or automation systems is described. In some embodiments, the method may include receiving linking information from a first device by a second device, linking the second device with the first device via a first connection, the linking based at least in part on the linking information, storing at least a portion of the linking information, and/or transmitting the stored linking information from the second device to one or more other devices via a second connection.

In some embodiments, the method may include transmitting linking information to the first device. In some embodiments, the first device may include a mobile phone, a portable electronic device securable to a user or a user's clothing, and/or a key fob.

In some embodiments, linking the second device with the first device via the first connection may include linking via a Bluetooth connection. In some embodiments, the linking information may include pairing information. In some embodiments, the pairing information may include at least one of legacy pairing information, secure simple pairing information, and/or combinations thereof.

In some embodiments, the method may include linking the first device directly to each of the one or more other devices based at least in part on the transmitting.

In some embodiments, the linking information may include at least one of a link key, a media access control (MAC) address of the first device, a clone of a media access control (MAC) address of the second device, and/or combinations thereof.

In some embodiments, the method may include establishing the second connection, wherein the second connection may include a secure connection.

In some embodiments, establishing the second connection may include sending secure data between the second device and the one or more other devices. In some embodiments, the secure data may include at least one of a key and a secret. In some embodiments, the second connection may include a wired connection.

In some embodiments, the second connection may include a non-Bluetooth connection.

In some embodiments, receiving linking information from the first device by the second device may include receiving a user input from the first device by the second device. In some embodiments, the user input may include at least one of a pin and a password.

In some embodiments, the second connection may include a direct connection between the second device and the one or more other devices.

In some embodiments, the second connection may include a network connection between the second device and the one or more other devices.

In some embodiments, the second device may include a system panel.

According to at least one embodiment, an apparatus for security and/or automation systems is described. In some embodiments, this apparatus may include a second device to communicate with a first device via a first connection, the second device to communicate with one or more other devices via a second connection, a processor, memory in electronic communication with the processor, and/or instructions stored in the memory, the instructions being executable by the processor to: receive linking information from the first device by the second device, link the second device with the first device via the first connection, the linking based at least in part on the linking information, store at least a portion of the linking information, and/or transmit the stored linking information from the second device to the one or more other devices via the second connection.

In some embodiments, the second device may include a security system panel. In some embodiments, the first device may include a mobile phone, a portable electronic device securable to a user or a user's clothing, and/or a key fob.

According to at least one embodiment, a non-transitory computer-readable storage medium storing computer executable code for security and/or automation systems is described. In some embodiments, the code is executable by a processor to: receive linking information from a first device by a second device, link the second device with the first device via a first connection, the linking based at least in part on the linking information, store at least a portion of the linking information, and/or transmit the stored linking information from the second device to one or more other devices via a second connection.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following a first reference label with a dash and a second label that may distinguish among the similar components in some cases. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
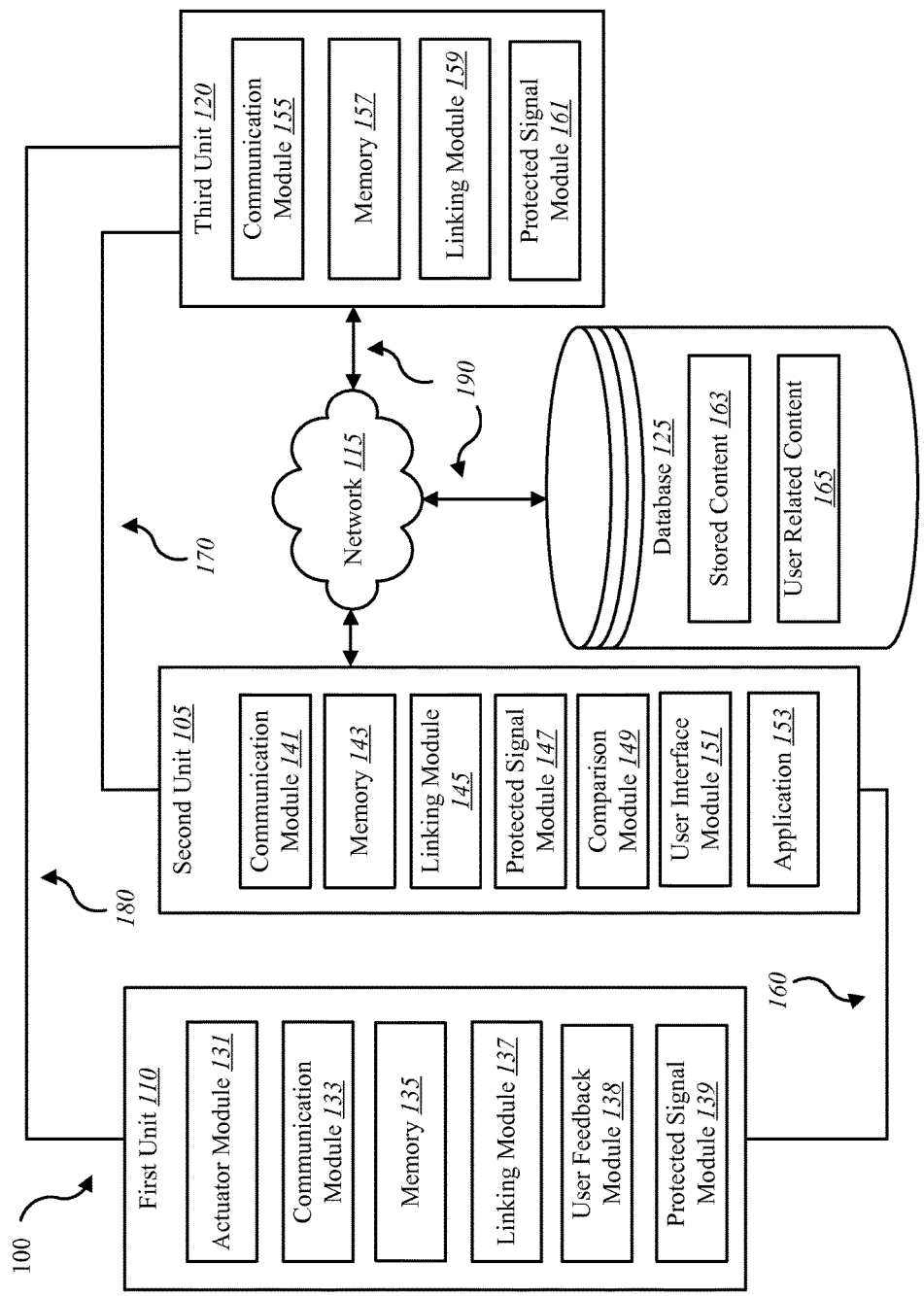
FIG. 1 shows a block diagram relating to a security and/or an automation system, in accordance with various aspects of this disclosure.

Because electronic systems continue to develop and become more complex—including using numerous related and/or connected devices—there exists a need to help connect multiple devices without requiring burdensome and complicated procedures, while also enhancing functionality. The present systems and methods clone a signal, a characteristic, and/a connection between two devices and use this cloned information with other devices. This decreases system complexity, increases functionality, and provides a better user-centered experience.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

In some embodiments, cloning one or more signals, characteristics, and/or communication parameters may include replicating, storing, copying, imitating, recreating, modifying, and/or other operations.

In some embodiments, one or more devices may be used to enable entry into a structure—such as a home and/or a business. In some embodiments, these one or more devices may include a smartphone, wearables (e.g., Fitbit, NikeFuelBand, etc.), key fobs, shoes and/or clothing with electronic chips, watches, glasses, and/or other devices. At least some of these devices may be Bluetooth enabled.

In some embodiments, access to a structure may be based at least in part on having a particular device. For example, a system—such as a security and/or an automation system—may tie a certain device (e.g., a first device, device A) to a certain person (e.g., user A). In some embodiments, access to a structure may be based at least in part on the proximity of a particular device to a structure and/or a another device, and/or a signal strength related to a particular device's signal and/or connection. For example, whether user A is able to enter a structure may depend at least in part on one or more of: the proximity of device A to a structure itself, a device within a structure (e.g., a second device), and/or the strength of a signal and/or a connection relating to device A and/or another device.

Bluetooth technology—unlike some other commonly used signals and connections (e.g., Wi-Fi, etc.)—utilizes frequency shifting, which means that the frequency for the communication of the two Bluetooth-paired devices changes over time. This shifting provides for a more secure connection compared to other systems, including systems that may continually send out a periodic signal at a designated frequency. Using a Bluetooth (including Bluetooth, legacy Bluetooth, Bluetooth 1.0, 2.0, 3.0, 4.0, 4.1, etc., and/or Bluetooth Low Energy (sometimes called Ultra Low Bluetooth) sometime include Secure Simple Pairing) connection also provides a tool for wide-reaching implementation that becomes increasingly available as even more people own and/or regularly use Bluetooth-enabled devices.

Other types of communication technology including, but not limited to, short range wireless communication protocol and/or near field communication (NFC) may also be used instead of, in addition to, and/or in conjunction with Bluetooth and/or other communication methods.

Bluetooth technology is only one example and should not be construed to limit this disclosure that applies with equal force to other short range wireless communication protocols and technologies. In some embodiments, the short range wireless communication protocols that may be used will be capable of requiring authentication of at least some information communicated between one or more elements, encrypting at least some information communicated between one or more elements, and/or sharing one or more pieces of confidential information (e.g., keys that may include link keys, etc.).

But Bluetooth technology requires a one-to-one pairing that may be described as a master-slave relationship. This one-to-one pairing, however, requires a distinct connection between the devices and in systems having multiple user devices and/or multiple in-structure devices numerous one-to-one connections may present difficult problems.

In some embodiments, other functions related to this cloning technology may be carried out and/or performed relative to devices outside and/or inside a particular structure. For example, a business may include multiple devices (i.e., lights, cameras, locks, computers, televisions, speakers, etc.) that are enabled to communicate with a user's device. In some embodiments, the multiple devices may communicate with one or more users' devices using a Bluetooth connection.

By using the present systems and/or methods described in this disclosure, user devices and structural devices may be able to better communicate and/or not rely on one direct, linear connection. For example, using the present systems and/or methods, the first device may communicate with the second device and/or the other devices directly (e.g., third, fourth, and/or other devices). In addition, the second device may communicate with the first device and/or the other devices (e.g., third, fourth, and/or other devices). In addition, the other devices (e.g., third, fourth, and/or other devices) may communicate with the first device and/or the second devices.

In some embodiments, at least some—if not all—of these devices may communicate directly without requiring another device and/or without communicating through another device. For example, assuming a first device and a second device are linked using a connection (e.g., a Bluetooth connection) and other devices are connected, as a user changes location inside and/or outside a structure or other location, the other devices can communicate with the first and or the second devices despite only establishing the first connection one time (e.g., only pairing the first device with the one second device).

For example, a user's smartphone may pair using a Bluetooth connection with a first speaker in a home. This connection can then be cloned and as a user moves throughout the house the user's smartphone may communicate with other speakers and/or devices—despite not being paired with the other speakers and/or devices. In addition, as the user moves outside the home, the user's smartphone may communicate with other devices and/or speakers (e.g., a user's car)—all without having to pair directly with all the other devices (speakers, cars, etc.).

In other embodiments, at least some—if not all—of these devices may communicate indirectly using another device as an intermediate and/or by communicating through another device.

In addition, using location-based permissions, one or more users may be authorized and/or prohibited from accessing one or more areas, rooms, devices, locks, etc. For example, a system may be able to notify a first user (e.g., a parent) if another user (e.g., a child) accesses and/or attempts to access a particular area (e.g., a home office), a particular device (e.g., a gun safe, a computer), and/or other devices—based on one or more parameters. These parameters may include user preferences, system preferences and/or limitations, device preferences and/or limitations, and/or others.

In some embodiments, creating a connection between multiple devices includes sharing one or more keys between the multiple devices. These one or more keys may facilitate sharing information between the multiple devices and/or communicating between the multiple devices.

In some embodiments, information—including these one or more keys—may be cloned to other devices that are not part of a first connection. For example, a first device and a second device may communicate via a connection—where, in some embodiments, this connection may include a Bluetooth connection. In some embodiments, this Bluetooth connection may require a media access control (MAC) address and/or a key. Based at least in part on this connection (e.g., between a first device and a second device), one of the devices (e.g., the second device) may communicate information to other devices (e.g., a third device, a fourth device, etc.).

In some embodiments, this communicated information may include any information related to the connection of first device and the second device. In some embodiments, this information may include a MAC address, a key, and/or other related information, among other information. In some embodiments, this information may include a key, a MAC address of the first device, and/or a clone of a MAC address of the second device. By providing at least some of the cloned information, the other devices may be able to communicate with a first device, a second device, and/or between multiple other devices.

In some embodiments, by using at least some of this information with other devices the first device may only "see" the second devices and the other devices as one device and/or group. This provides additional features and functions—particularly from a user's perspective—because the way the system and the user's first device (e.g., a smartphone) will see the other devices is based on one group and/or one device, instead of a list of every single device. Thus, if the other devices included 20 devices, then instead of showing the second device and the 20 devices in one lengthy list the user may only see one device (e.g., the second device) and/or one group (e.g., the second device's cloned group). This creates a better user experience.

Alternatively, in some embodiments, the cloned devices and/or groups may be displayed as distinct, individual devices that the user can see, adjust, monitor, etc.

In some embodiments, some of the devices described in this disclosure may include smartphones, wearables (e.g., Fitbit, NikeFuelBand, etc.), key fobs, shoes and/or clothing with electronic chips, watches, glasses, system panels, computers, and/or other devices.

In some embodiments, the sharing of the cloned information (e.g., a key, a MAC address) related to one or more devices is performed by having a device (such as the second device, e.g., a system panel, a door lock, a doorbell system, etc.) assemble and communicate certain information to one or more third devices (e.g., lights, cameras, locks, door locks, computers, televisions, monitors, clocks, entertainment systems, music players, thermostats, speakers, cars, vehicles, etc.), and/or other additional devices.

In some embodiments, communication to the third device (and/or other devices) may be unicast, multicast, broadcast, and/or otherwise sent. In some embodiments, after the third device receives this information, this third device (and/or one or more other related devices) would then store the cloned information (e.g., using a table in memory, etc.).

In some embodiments, at least one device may correlate at least some of the stored information with one or more users. One or more rules and/or settings may facilitate, inhibit, and/or prohibit certain actions based at least in part on correlating the stored information with one or more users.

For example, certain stored information may be correlated with a non-administrator user that may have limited access to certain devices, areas, and/or other characteristics associated with the system—including, limiting the non-administrator user's entry into a room, an area, and/or use of one or more devices. As another example, a non-administrator user may be prohibited from unlocking an interior door lock that may lead to a home office, a closet, and/or a safe room.

In some embodiments, exemplary methods and/or systems may include: a first device (e.g., a customer device) being used to scan for and/or find other Bluetooth-enabled devices. In some embodiments, a second device (e.g., a system panel) may be a Bluetooth enabled device and may be found by the first device. The first device and the second device may then pair with each other. In some embodiments, this pairing may be performed automatically, semi-automatically, and/or based on manual user instruction.

In some embodiments, this pairing may be based at least in part on: one or more instructions and/or protocols, user input, system preferences and/or settings, devices preferences and/or settings, a pin code, a pass phrase, a key, and/or based on other methods. In some embodiments, the second device may be aware of and/or capable of communication with other devices associated with and/or related to the second device, including those related to a specific customer account.

In some embodiments, the second device may clone at least some of the pairing information related to the first device and/or the second device. This cloning may occur by the second device communicating with a remote server through one or more wired and/or wireless communications, by the second device communicating directly with the other devices (e.g., a third device), and/or by other related methods.

In some embodiments, before, during, and/or after the cloning and/or the sharing of the cloned information, the second device (and/or other devices, such as a third device) may send periodic requests to initiate contact with the first device. In some embodiments, when the first device responds, the other devices (e.g., second device, third device, and/or other devices) may be able to receive one or more communications from the first device and/or perform one or more actions based at least in part on the response and/or other information. In some embodiments, the other devices, the first device, and/or the second device may use certain information—including but not limited to the first device's response—to determine relative location and/or decide if any action should be taken (e.g., unlocking a door, turning on a light, etc.).

In some embodiments, the present systems and methods facilitate communication between numerous devices based on only one set of paired devices (e.g., based on a Bluetooth pairing connection). This allows for direct communication between the numerous devices themselves, without having to always be routed through an intermediate device (e.g., a controller) and without having to pair each set of devices. Instead, the present systems and methods facilitate improved communication using a mesh communication system rather than a more-limited, linear based system—enhancing user experience by limiting organizational difficulties based on multiple, cumbersome pairings that would otherwise be required.

In some embodiments, the third device (and/or the fourth, the fifth, and/or other devices) may be designated as a Master device for communications with at least one of the first device, the second device, and/or other devices. In some embodiments, these one or more Master devices may be able to initiate and/or receive communication with the first device, the second device, and/or other devices.

In addition, in some embodiments, a different user (i.e., another non-administrator user, an administrator user) may be notified about certain rules, and/or protocols—including a prohibition related to the non-administrator user. This different user (or users) may be able to receive one or more notifications related to other users, rules, protocols, statuses, conditions, actions, events, and/or prohibitions—where at least one notification may be based at least in part on information related to one or more devices (including the first, second, third, and/or other devices).

In some embodiments, this third device may include appropriate hardware and/or software to enable this third device to listen and/or communicate with at least one of the first device and/or the second device. In some embodiments, this appropriate hardware and/or software may include a Bluetooth-compatible chip that would facilitate communication from the third device to at least one of the first device and second device—including communication based on non-Bluetooth communication. In some embodiments, this appropriate hardware and/or software may facilitate communication via radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signal types.

By communicating this information to the other devices (e.g., a third device), the other devices will then be able to communicate with and/or listen to at least one of the first device and the second device. This communication may be performed using radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signal types.

In some embodiments, after other devices are able to communicate based at least in part on the cloned information, multiple systems and/or methods may be used. For example, a first device (e.g., a smartphone) may be able to communicate directly and/or indirectly with a second device (e.g., a system panel) inside a structure (e.g., a home). An ability to communicate directly may be based at least in part on one or more parameters related to a proximity of the first device and the second device, and/or signal and/or connection characteristics related to the first device and the second device.

In another example, however, a first device (e.g., a smartphone) may not be able to communicate directly with a second device (e.g., a system panel) inside a structure (e.g., a home). In some embodiments, the first device may be able to communicate with another device (e.g., a door lock) based at least in part on a connection that is based at least in part on the cloned information, but that may not be a Bluetooth connection. Then the other device (e.g., a door lock) may be able to communicate with a second device (e.g., a system panel). This interconnectivity may facilitate and/or supplement communication between devices that may not otherwise have been able to communicate, or whose communication would have been significantly hindered and/or entirely prevented.

In some embodiments, a first signal and/or a first communication related to one or more devices may change, shift, and/or rotate based on time, events, and/or other related parameters. And, based on a first signal and/or a first communication related to some devices, other signals and/or communication may be based at least in part on this first signal and/or communications. Accordingly, the other signals (e.g., second signal and/or second communication), may also change, shift, and/or rotate based at least in part on the first signal. For example, if a first signal relating to a first unit and a second unit shifts its operating frequency, a second signal relating to the second unit and a third unit may shift its operating frequency based at least in part on the first signal.

FIG. 1 is a block diagram illustrating one embodiment of a system 100 in which the present systems and methods may be implemented. In some embodiments, the systems and methods described here may be performed in relation to on one or more devices illustrated in system 100. The system 100 may include first unit 110, second unit 105, third unit 120, database 125, and/or network 115 that allows first unit 110, second unit 105, third unit 120, and/or database 125 to communicate with one another and/or other system components—directly between any of the components, indirectly through one or more intermediate components, and/or some combination.

Although elements of first unit 110, second unit 105, third unit 120, and/or database 125 may be depicted as being internal to the respective components, it is understood that one or more of the elements may be external to each component and may be connected to one or more respective components (e.g., 105, 110, 115, 120, and/or 125) through one or more wired and/or wireless connections.

First unit 110 may include actuator module 131, communication module 133, memory 135, linking module 137, user feedback module 138, and/or protected signal module 139, among others. First unit 110 may connect to second unit 105 using a connection 160. Connection 160 may include a wired connection, a wireless connection, and/or both. In some embodiments, connection 160 may facilitate communication, transmission, encryption, authentication, and/or changing certain signal characteristics, among other things.

Second unit 105 may include communication module 141, memory 143, linking module 145, protected signal module 147, comparison module 149, user interface module 151, and/or application 153, among others. Second unit 105 may connect to first unit 110 and/or third unit 120 using connections 160 and/or 170. Connections 160 and/or 170 may include wired connections, wireless connections, and/or both. In some embodiments, connections 160 and/or 170 may facilitate communication, transmission, encryption, authentication, and/or changing certain signal characteristics, among other things.

Any elements discussed with respect to other components and/or elements of system 100 (and/or others) may also apply to similar and/or different elements of other components and/or elements of system 100 and/or others. For example, discussion about the relationship between first unit 110 and second unit 105, can also apply to the relationship between first unit 110 and third unit 120, second unit 105 and third unit 120, and/or others.

Third unit 120 may include communication module 155, memory 157, linking module 159, and/or protected signal module 161, among others. Third unit 120 may connect to first unit 110 and/or second unit 105 using a connections 160, 170, and/or 180. Connections 160, 170, and/or 180 may include a wired connection, a wireless connection, and/or both. In some embodiments, connections 160, 170, and/or 180 may facilitate communication, transmission, encryption, authentication, and/or changing certain signal characteristics, among other things.

The elements and/or components described as relating to one or more units and/or other structures may apply equally to other components and/or elements. For example, discussion relating to linking module 137 may apply equally to linking module 145 and/or linking module 159.

In addition, interactions between different elements, components, and/or units (e.g., such as communication relating to one or more protected signals) may apply equally to other components and/or elements. For example, discussion related to functions relating to authentication and/or encryption of communications relating to first unit 110 and/or second unit 105 may apply equally to functions relating to authentication and/or encryption of communications relating to third unit 120 and/or second unit 105, among others.

In some embodiments, first unit 110 may include an actuator module 131. This actuator module 131 may include one or more buttons, switches, knobs, toggles, levers, regulators, actuators, and/or other devices for being actuated. In some embodiments, actuator module 131 may activate first unit 110, second unit 105, network 115, third unit 120, and/or database 125. In some embodiments, actuator module 131 may be actuated by a user electronically, automatically, and/or physically, including being actuated by the user's hand. In some embodiments, this actuator module 131 may be actuated based at least in part on one or more inputs, such as a system 100 input, that may send a signal from the actuator module 131 to another module of first unit 110 and/or another component and/or element of a system.

In some embodiments, first unit 110 may include communication module 133. This communication module 133 may facilitate communication between first unit 110 and other components of system 100, including but not limited to second unit 105, network 115, third unit 120, and/or database 125. In some embodiments, communication module 133 may facilitate communication between first unit 110 and other elements of system 100, such as actuator module 131, communication module 133, memory 135, linking module 137, user feedback module 138, and/or protected signal module 139, among others. In some embodiments, communication module 133 may facilitate communication via one or more connections (e.g., connection 160). In some embodiments, communication module 133 may facilitate communication via one or more wired and/or wireless connections.

In some embodiments, communication module 133 may generate a notification and/or a transmission in response to receiving one or more signals from one or more other modules, including but not limited to actuator module 131, memory 135, linking module 137, protected signal module 139, user feedback module 138, and/or other components or elements of a system (e.g., system 100). This notification and/or transmission may be sent to one or more components and/or elements of system 100.

In some embodiments, first unit 110 may communicate through communication module 133 (or not, but instead directly) with second unit 105, third unit 120, database 125, and/or other components and/or elements via a communication path that includes a combination and/or one or more designated connections (e.g., connection 160) and/or network 115.

In some embodiments, network 115 may include cloud networks, local area networks (LAN), wide area networks (WAN), virtual private networks (VPN), wireless networks (using 802.11, for example), cellular networks (using 3G and/or LTE, for example), and/or other networks. In some embodiments, the network 115 may include the internet.

In some embodiments, first unit 110 may include memory 135. In some embodiments, memory 135 may include computer executable instructions that can be executed by one or more processors. These one or more processors may be present in an element of first unit 110 (e.g., communication module, linking module, and/or protected signal module, among others) and/or one or more other components of system 100 (e.g., second unit 105 and/or third unit 120).

In some embodiments, memory 135 may include computer executable instructions that may cause first unit 110 to interact with one or more components of system 100, such as second unit 105 and/or third unit 120. In some embodiments, memory 135 may contain, among other code, the Basic Input-Output system (BIOS) which controls basic hardware operation such as the interaction with peripheral components or devices.

In some embodiments, first unit 110 may include a linking module 137. This linking module may act—independently and/or with other components and/or elements—to link first unit 110 with one or more other units. This linking module may (with protected signal module 139) facilitate secure communications between first unit 110 and second unit 105. This linking module may facilitate establishing a short wave wireless communication connection, such as Bluetooth, using one or more parameters, including but not limited to one or more MAC addresses, keys, signal frequencies, and/or other parameters. In some embodiments, linking module 137 may facilitate communication one or more components (e.g., first unit 110 and second unit 105) based at least in part on one or more exchanges of information passed at least from one unit to another unit and/or between both units. For example, first unit 110 and second unit 105 may communicate regarding one or more keys—such as link keys—that each may store and that are common to both.

In some embodiments, user feedback module 138 may facilitate providing feedback about one or more system 100 components and/or elements. For example, user feedback module 138 may provide feedback related to first unit 110, second unit 105, third unit 120, and/or database 125. In some embodiments, user feedback module 138 may provide feedback related to connection 160. In some embodiments, this feedback may include visual, audible, tactile, and/or other types of feedback, or some combination of two or more feedback types. In some embodiments, this feedback may be related to one or more actuators (e.g., buttons) and/or light emitting diodes (LEDs).

In some embodiments, first unit 110 may include protected signal module 139. In some embodiments, protected signal module may include one or more processors to perform one or more functions. In some embodiments, the protected signal module 139 may generate one or more signals. Or, the protected signal module 139 may transmit one or more signals originated from other sources—including but not limited to other components of system 100.

In some embodiments, protected signal module 139 may be able to generate a signal having one or more characteristics. These characteristics may include creating one or more packets present in a signal. These one or more packets may include secure data including, but not limited to, encryption information such as a key, authorization information such as a secret, and/or other information.

In some embodiments, protected signal module 139 may be able to communicate with other components of system 100 directly, through communication module 133, by one or more connections (e.g., connection 160), and/or by other communication methods.

In some embodiments, protected signal module 139 may transmit one or more packets of information that have been encrypted. In some embodiments, communication module 133 may transmit one or more packets of information, that have been encrypted, by one or more modules of first unit 110. These encrypted packets may have been encrypted by first unit 110, second unit 105, and/or some other component and/or element—present in system 100 and/or another system. In some embodiments, these encrypted packets may include a status byte and/or one or more hash bytes. In some embodiments, the one or more hash bytes may each include a 24 bit hash.

In some embodiments, the one or more packets may include a counter, which may correspond to a number of events. The number of events may include the number of times one or more packets have been sent, the actuator module 131 has been activated, and/or other events.

In some embodiments, one or more components of system 100 (e.g. second unit 105) includes an encryption algorithm designed to obscure data and/or a hash algorithm to require authentication of data. In some embodiments, the encryption may include a rabbit encryption, symmetric cryptograph, asymmetric cryptography, and/or other types. In some embodiments, the authentication hash is a 24 bit hash.

In some embodiments, when actuator module 131 is actuated, (e.g., a button is pressed) data packets—encrypted and/or requiring authentication—are transmitted by the first unit 110. In some embodiments, the second unit 105 receives the data packets transmitted by the first unit 110 and then decrypts the encrypted data in the data packets, if applicable. In some embodiments, the encryption may include a key (e.g., a 128 bit key). In some embodiments, protected signal module 147 may perform one or more operations disclosed with respect to the second unit 105. In some embodiments, a protected signal comprises one or more data packets. In some embodiments, the key and/or the secret may be stored in the code section of first unit 110, second unit 105, and/or others.

In some embodiments, the second unit 105 receives the data packets transmitted by first unit 110 and then hashes/authenticates the data. In some embodiments, the hash may include a secret (e.g., a 72 bit secret). Based at least in part on the hashing/authenticating of the data, the second unit 105 may transmit one or more data packets to third unit 120.

In some embodiments, first unit 110 may generate a key used for encryption and/or a secret used for authentication. The key and/or the secret may be generated based on user input, based on system-detected parameters, based on system events, and/or automatically.

In some embodiments, the key and/or the secret may be generated based on input received by the actuator module 131. The input received by the actuator module 131 may include a number of times an actuator (e.g., a button) is actuated. Or the input received by the actuator module 131 may include whether a combination of one or more actuators are actuated. In some embodiments, the input received by the actuator module 131 may include whether one or more actuators are actuated for a time interval (e.g., 5, 10, 15, 20, or 30 seconds).

In some embodiments, the input required to generate a key and/or a secret may be sufficient to prevent errant, meaningless generations. For example, the time interval required may be sufficiently long to avoid a user's errant input (e.g., 15 seconds or more). As another example, the input required may include one or more types of input—including but not limited to an input that a combination of one or more actuators are actuated over a certain time interval (e.g., buttons 1 and 3 are activated simultaneously for 15 seconds or more).

In some embodiments, the key and/or the secret may each be random, pseudo-random, non-random, non-pseudo random, and/or some combination. In some embodiments, the key is generated using a very low oscillator (vlo) and a random jump number that may be incremented by a predetermined value at a specified event (e.g., actuating actuator module 131). In some embodiments, the secret is generated using a very low oscillator (vlo) and a random jump number that may be incremented by a predetermined value at a specified event (e.g., actuating actuator module 131).

In some embodiments, the first unit 110 may transmit a key and/or a secret. In some embodiments, transmitting a key and/or a secret from the first unit 110 to another component of system 100 may occur after a certain time interval. For example, first unit 110 may generate a key and/or a secret during a 15 second interval and then first unit 110 may transmit the key and/or the secret after the completion of the 15 second interval.

In some embodiments, the first unit 110 may transmit the key and/or the secret during the same time interval when each is generated. For example, first unit 110 may generate a key and/or a secret during a 15 second interval and transmit the key and/or the secret during the same 15 second interval.

In some embodiments, the second unit 105 may receive the key and/or the secret. Based at least in part on receiving the key and/or the secret, the second unit 105 may store, transmit, map, and/or capture, identifying information related to the first unit 110 and/or the third unit 120 that transmitted the key and/or the secret. In some embodiments, this identifying information may include the key serial number of the sending unit.

In some embodiments, the communication of information, including one or more data packets between one or more system components (e.g., first unit 110 and second unit 105, second unit 105 and third unit 120, etc.) may include encryption having a key and/or authentication having a secret.

In some embodiments, the second unit 105 may perform certain actions related to data packets, including but not limited to those data packets received by the second unit from another component of a system. In some embodiments, performing certain actions may be based at least in part on whether: the key and/or the secret have been transmitted to the second unit 105; the identifying information has been transmitted and/or received by first unit 110, second unit 105, and/or third unit 120. In some embodiments, these certain actions may include decrypting one or more encrypted data packets, authenticating one or more data packets requiring authentication, and/or other related actions.

In some embodiments, the key and the secret may be transmitted by and/or to one or more devices. In some embodiments, the key and the secret may be transmitted simultaneously, in parallel, in series, and/or otherwise. For example, second unit 105 may transmit the secret to the third unit 120 and then transmit the key to the third unit 120. In other embodiments second unit 105 may transmit the key to the first unit 110 and/or third unit 120 and then transmit the secret to the first unit 110 and/or third unit 120.

In some embodiments, the communication link between first unit 110 and second unit 105 (and/or second unit 105 and third unit 120, among others) may be a secure communication link using a protected signal. This secure communication link may require authentication, encryption, and/or both. The communications between first unit 110 and second unit 105 (and/or second unit 105 and third unit 120, among others) may include multiple secure communications between them and/or other devices. These secure communications—transmitted and/or received via secure communication links—may be performed using one communication link to perform all the required functions or multiple communication links.

In some embodiments, first unit 110 and second unit 105 may both use authentication. In some embodiments, the authentication may use one or more public-private authentication key pairs. Where multiple authentication key pairs are created and/or used at least some of the authentication key pairs may pertain to the first unit 110 and/or at least some of the authentication key pairs may pertain to the second unit 105.

In some embodiments, at least a portion of the device-specific authentication key pairs are known only to one entity, and not others. For example, a first authentication key pair specific to first unit 110 may not be known to second unit 105. As another example, a private part of the first key pair specific to first unit 110 may not be known to second unit 105, but a public part of the first key pair specific to first unit 110 may be known to second unit 105.

In some embodiments, a public part of first unit 110's authentication key pair would be communicated to the second unit 105, while the private part of the first unit 110 authentication key pair would not be communicated to the second unit 105.

In some embodiments, a dual authentication may occur, which may include authenticating the first unit 110 and authenticating the second unit 105. In some embodiments, authentication may require multiple pieces of information to be verified. For example, the first unit 110 may authenticate a communications link by verifying a person or an entity associated with the second unit 105 and/or verifying a server or a device (which may or may not be related to the second unit—such as a server). In some embodiments, this authentication may include using a username and/or a password. In some embodiments, this authentication may include using a secret and/or an API key. In some embodiments, this authentication may include using an authentication key pair—which may include generating a key pair specifically related to each entity and/or device. In some embodiments, this authentication may include a client certified authenticated secure sockets layer (SSL) connection.

In other embodiments, the secure communications between two devices (e.g., second unit 105 and third unit 120) may be performed based on multiple secure connections—including multiple secure connections running in series and/or in parallel. In some embodiments, at least some of the multiple secure connections may require authentication. In other embodiments, every secure connection may require authentication.

In some embodiments, communication module 133 may facilitate secured communication at least in part based on communication with protected signal module 139. Protected signal module 139 may independently perform all actions relating to authentication and/or encryption relating to the systems and/or methods described in this disclosure. Or, in some cases, protected signal module 139 may perform actions relating to authentication and/or encryption relating to the systems and/or methods described in this disclosure in conjunction with one or more other components and/or elements of other systems.

In some embodiments, protected signal module 139 may generate confidential information. In some embodiments, protected signal module 139 may generate one or more authentication keys (also discussed as secrets). In some embodiments, an authentication key may include multiple parts, including a private key and/or a public key.

In some embodiments, protected signal module 139 may receive confidential information from another device and/or source. In some embodiments, protected signal module 139 may receive one or more authentication keys from another device.

In some embodiments, one or more devices illustrated in system 100 may communicate with and/or link to database 125. Database 125 may include stored content 163 and/or user related content 165. In some embodiments, stored content 163 may include data generated, received, transmitted, linked, stored, and/or compared by at least one of first unit 110, second unit 105, third unit 120, and/or network 115, among others. In some embodiments, information related to data packets, that may be encrypted and/or require authentication, may be included as stored content 163. In some embodiments, first unit 110, second unit 105, and/or third unit 120 may access stored content 163 in database 125 over network 115.

In some embodiments, database 125 may be internal or external to one or more components of system 100 (i.e., connected to a device through network 115 and/or connected directly to one or more devices of system 100). For example, at least a portion of database 125 may be internal and/or external to first unit 110, second unit 105, and/or third unit 120. In some embodiments, user related content 165 may include, but is not limited to, user preferences, passwords, personal information, system information (e.g., model numbers, installation dates, etc.), content specification other components of system 100 including first unit 110, second unit 105, and/or third unit 120, and/or network 115, information designated by the user and/or an administrator as related to the system, and/or other information.

In some embodiments, first unit 110 and second unit 105 may communicate via a Bluetooth connection using pairing information, while third unit 120 and second unit 105 may communicate via one or more connection that does not use pairing information and/or may be a non-Bluetooth connection. In some embodiments, first unit 110 and second unit 105 may communicate via a Bluetooth connection using pairing information, while third unit 120 and second unit 105 may communicate via one or more connections that uses cloned information at least related to the pairing information used by first unit 110 and second unit 105. In some embodiments, communication between second unit 105 and third unit 120 may include a connection based at least in part on radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. In some embodiments, first unit 110 and second unit 105 may communicate via one or more connections, which may include a Bluetooth connection. In some embodiments, third unit 120 and second unit 105 may communicate via one or more connections, which may include a Bluetooth connection.

All the actions, specifications, and communications described with respect to the modules of first unit 110 and/or second unit 105, may apply equally with communications between first unit 110 and/or third unit 120, second unit 105 and/or third unit 120, and/or other communications. This may include utilizing protected signal modules 147 and/or 161, communication modules 141 and/or 155, linking modules 145 and/or 159, and/or others.

In some embodiments, any transmitting and/or communication may be performed via network 115. In some embodiments, network 115 may include a wired network, while in other embodiments network 115 may include a wireless network. In some embodiments, of system 100 (and others) network 115 may include wired/and or wireless connections. In some embodiments, components such as first unit 110, second unit 105, and/or third unit 120 may be connected in multiple ways, including having one or more wired and/or one or more wireless connections.

In some embodiments, comparison module 149 may compare one or more pieces of information, including but not limited to information transmitted from and/or received by the first unit 110, second unit 105, third unit 120, and/or other components. In some embodiments, comparison module 149 may compare one or more portions of a key serial number, a key, a secret, an encrypted data packet, a data packet requiring authentication, a counter, a distance, an iteration value, and/or other information. In some embodiments, comparison module 149 may compare information related to or stored in second unit 105 with information related to or stored in first unit 110. In some embodiments, comparison module 149 may compare information related to or stored in second unit 105 with information related to or stored in third unit 120 and/or first unit 110. In some embodiments, comparison module 149 may compare information related to or stored in second unit 105 with information related to or stored in database 125.

In some embodiments, components of system 100 may have one or more pieces of identifying information associated with them. This identifying information may include, but is not limited to, a key serial number, a unit number, a model name, a model number, a software or a hardware version, and/or other related information.

Figure 2:
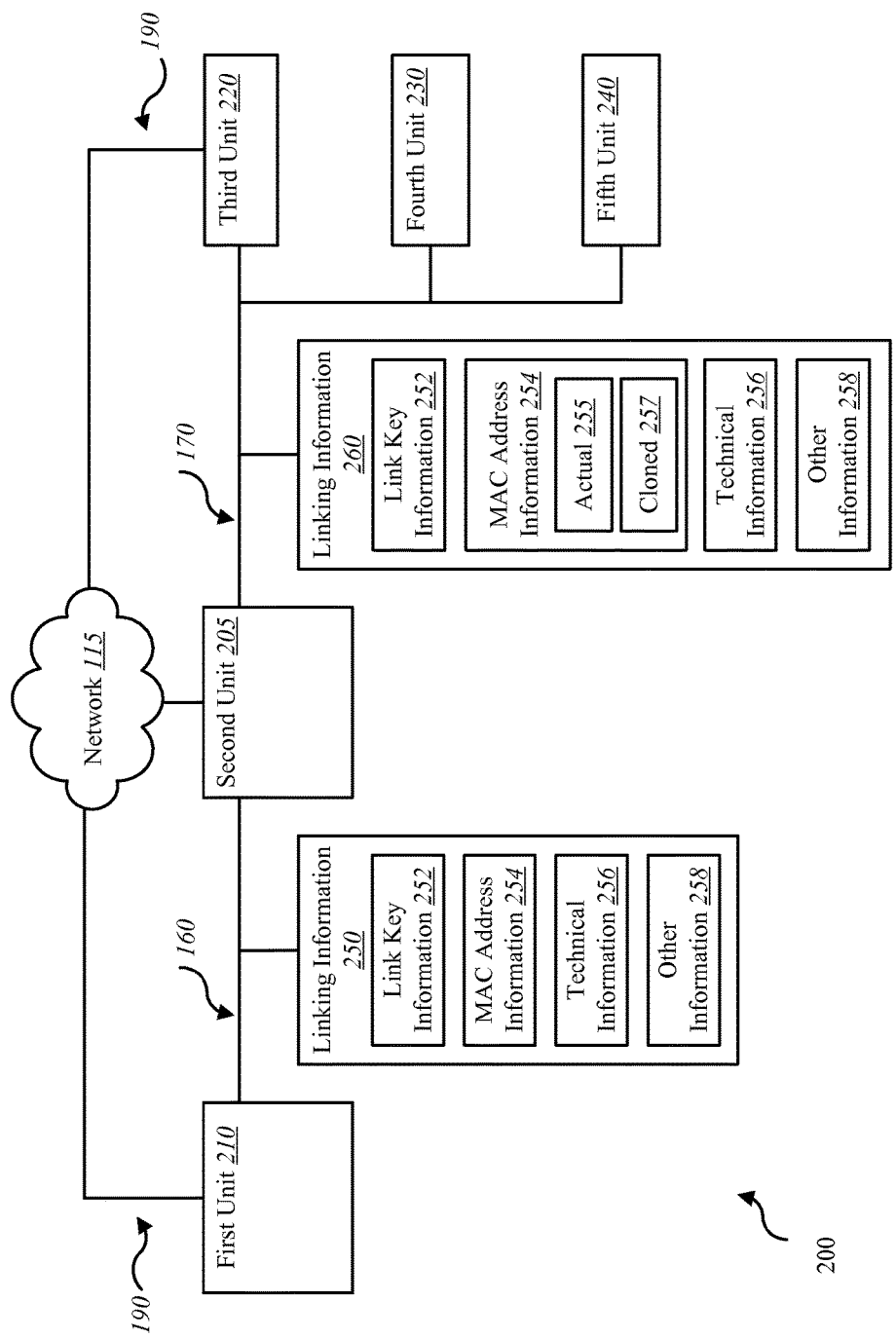
FIG. 2 shows a block diagram of devices relating to a security and/or an automation system, in accordance with various aspects of this disclosure.

FIG. 2 illustrates an example of a communications system 200 in accordance with various aspects of the disclosure. The system 200 may include first unit 210, second unit 205, third unit 220, fourth unit 230, fifth unit 240, network 115, and/or other components. In some embodiments, units may communicate with each using similar, different, exactly the same, and/or other variations of different signals.

For example, in some embodiments, first unit 210 and second unit 205 may communicate using one type of signal (e.g., Bluetooth), while second unit 205 and fifth unit 240 may communicate using another type of signal (e.g., Z Wave). In some embodiments, communication between second unit 205 and other units (220, 230, and/or 240) may include using a signal that requires authentication and/or decryption. In some embodiments, communication between second unit 205 and other units (220, 230, and/or 240) may be based at least in part on cloned information from one or more other connections and/or signals (such as communication between first unit 210 and second unit 205).

In some embodiments, connections 160, 170, and/or 190 may include one or more of a wired connection, a wireless connection, and/or both. In some embodiments, connections 160, 170, and/or 190 may facilitate communication, transmission, encryption, authentication, and/or changing certain signal characteristics, among other things.

In some embodiments, first unit 210 and second unit 205 include short range wireless communication protocol devices. In some embodiments, first unit 210 and second unit 205 communicate based on linking information 250. This linking information may include link key information 252, MAC address information 254, technical information 256, and/or other information 258.

The link key information 252 may include information related to one or more link keys that may be used to establish short range wireless communications. This link key information 252 may facilitate device communication as a way to link multiple devices. For example, with Bluetooth communication the signal frequencies may change over a period of time and the link key information 252 may facilitate communication between devices that know and/or have stored the link key—despite the shifting signal frequencies. In addition, MAC address information 254 may include information related to one or more MAC addresses of first unit 210, second unit 205, and/or other units in a system. In some embodiments, this MAC information may be used in conjunction with other information—such as link key information 252—(or alternatively solely by itself) to facilitate communication between multiple devices.

Technical information 256 and other information 258 may include information related to first unit 210, second unit 205, network 115, connection 160, and/or other components and/or elements of a system. This information may include, but is not limited to, device parameters (e.g., model, software version, manufacturer, hardware functions, features and limitations, etc.), signal parameters (signal requirements, functions, strength, performance, frequency, etc.), connection parameters (type, strength, reliability, etc.), network parameters (type, strength, reliability, etc.), and/or other information.

In some embodiments, second unit 205, third unit 220, fourth unit 230, and/or fifth unit 240 may include short range wireless communication protocol devices, where at least some of these devices may have different characteristics and/or communicate in different ways from communications with other units (e.g., first unit 210). For example, second unit 205 and fourth unit 230 may communicate via a 345 MHz connection that may or may not be authenticated, while second unit 205 may communicate with another unit via a Bluetooth and/or a Z Wave connection.

In some embodiments, second unit 205, third unit 220, fourth unit 230, and/or fifth unit 240 may communicate based on linking information 260. This linking information may include link key information 252, MAC address information 254, technical information 256, and/or other information 258.

Linking information 260 may be the same as, different, similar, and/or related to linking information 250, discussed here. For example, linking information 260 may include link key information that is the same as, different, similar, and/or related to link key information 252. In some embodiments, link key information 260 may be cloned link key information from one or more signals related to first unit 210 and second unit 205.

As another example, MAC address information 254 may be communicated from second unit 205 to third unit 220, fourth unit 230, and/or fifth unit 240, among others. This information may be used to facilitate communication between second unit 205 and other units and/or between first unit 210 and/or other units. In some embodiments, MAC address information 254 may be communicated by second unit 205 to third unit 220. This MAC address information 254 may include actual 255 MAC address information and/or cloned 257 MAC address information. For example, second unit 205 may communicate the actual MAC address of first unit 210 and/or other units, and second unit 205 may also communicate cloned MAC address information of second unit 205 and/or other units. In some embodiments, the MAC address information 254 may include actual MAC address information, cloned MAC address information, and/or some combination.

In some embodiments, third unit 220 may receive the actual MAC address of first unit 210 and/or the cloned MAC address of second unit 205. At least in part based on receiving the cloned MAC address of second unit 205, other units (e.g., third unit 220, fourth unit 230, etc.) may be able to communicate directly with first unit 210 via one or more connections 160, 170, 190, network 115, and/or some combination. In some embodiments, third unit 220 may receive the cloned MAC address of first unit 210 and/or the actual MAC address of second unit 205.

Figure 3:
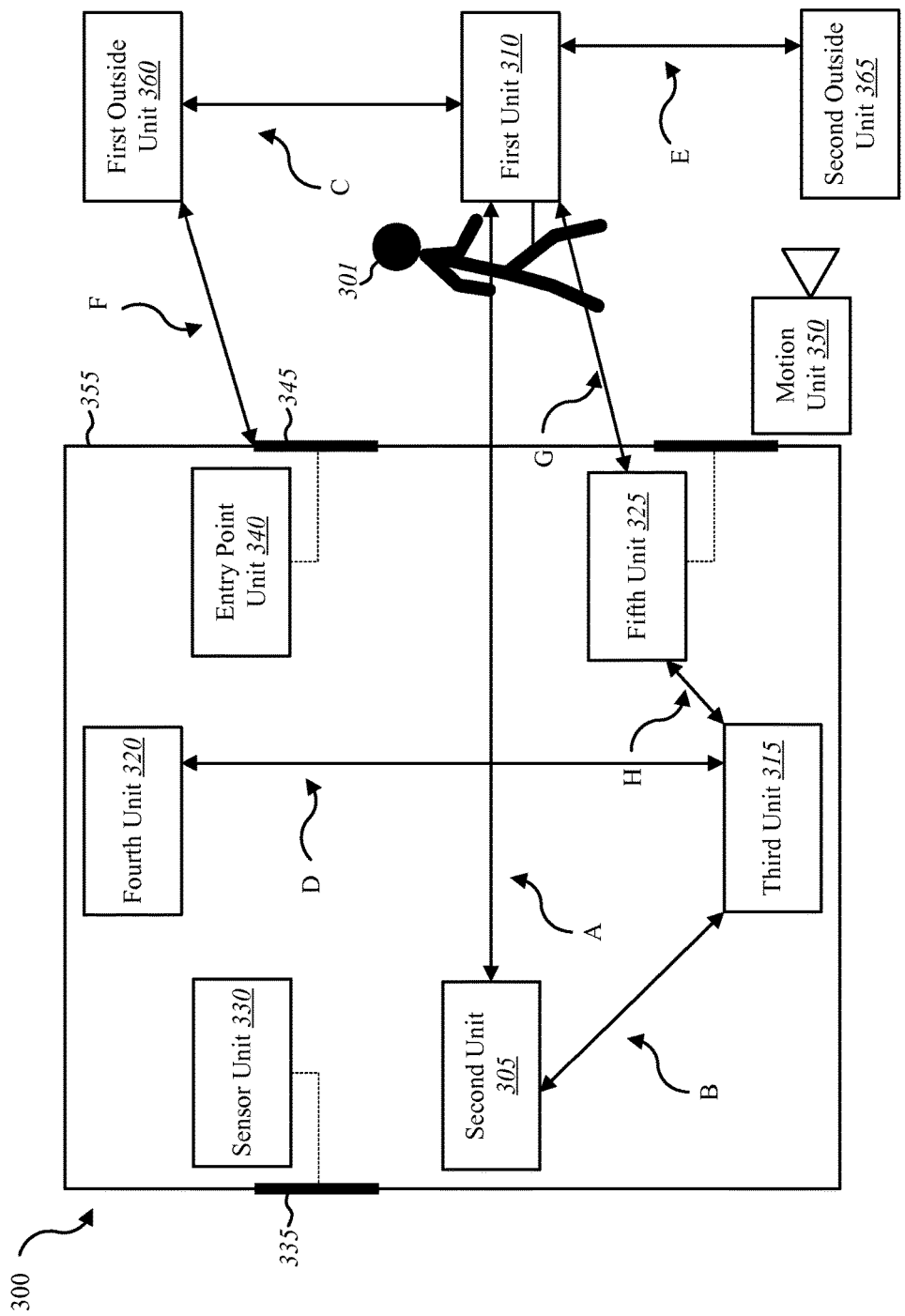
FIG. 3 shows a block diagram of devices relating to a security and/or an automation system, in accordance with various aspects of this disclosure.

FIG. 3 illustrates an example of a communications system 300 in accordance with various aspects of the disclosure. The system 300 may be related to a structure 355 that may include first unit 310, second unit 305, third unit 315, fourth unit 320, fifth unit 325, network 115, sensor unit 330, entry point unit 340, sensors related to openings 335 and/or 345, motion unit 350, first outside unit 360, and/or second outside unit 365, and/or other components. In some embodiments, each of A-H may be a distance between one or more units, sensors, areas, and/or other elements of a system.

In some embodiments, one or more components of a system (e.g., system 300) may include one or more sensors. These sensors may include, but are not limited to: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system.

In some embodiments, whether other characteristics related to user 301 and/or first unit 310 may be determined based on one or more units. For example, a user's position may be determined based on a relative position relating to one or more units (e.g., first outside unit 360). For example, if first unit 310 can communicate with first outside unit 360 then the user's position may be determined based at least in part on a relative position of first unit 310 with one or more other units. In some embodiments, this relative position may relate to multiple units, sensors, areas, positions, and/or other characteristics. For example, a user's 301 position may be determined based at least in part on the location of first unit 310 related to first outside unit 360, second outside unit 365, motion unit 350, entry point unit 340, opening 345, and/or second unit 305.

In some embodiments, using the present systems and methods allows for communication from the position of user 301 via first unit 310 to second unit 305. In some embodiments, first unit 310 may be too far away from second unit 305 (based on distance A) to reliably communicate. Using the present methods, first unit 310 may communicate with fifth unit 325 based on a distance G (that may be shorter than distance A). Then fifth unit 325 may communicate with second unit 305 directly and/or may communicate with third unit 315 based on distance H (and/or may then communicate with second unit 305 based on distance B). By using the cloned information, first unit 310 may be able to communicate indirectly with second unit 305 through and/or based at least partly on other units.

Figure 4:
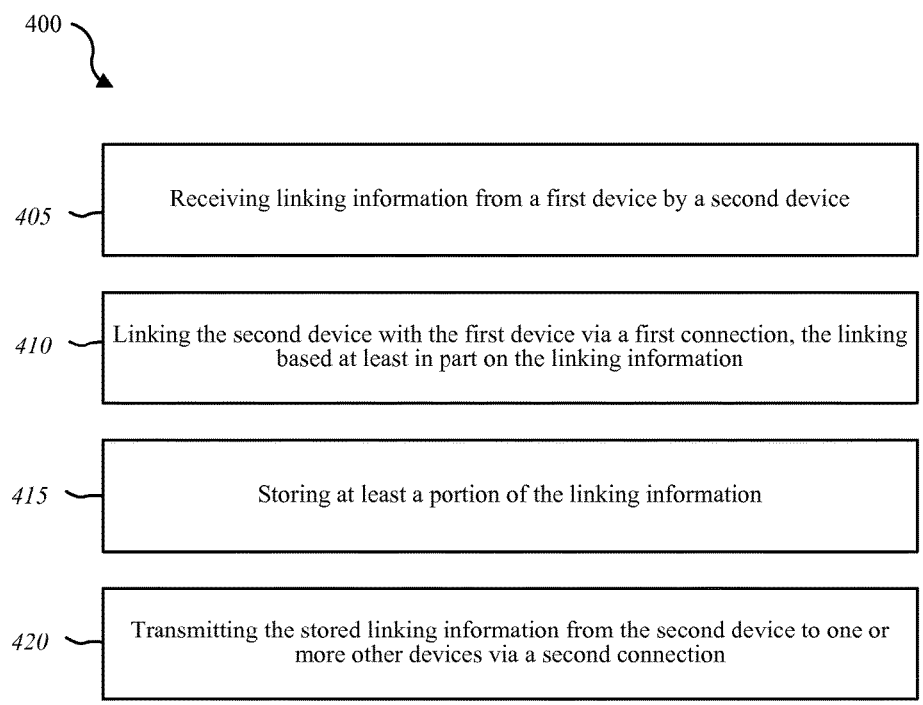
FIG. 4 is a flow chart illustrating an example of a method relating to a security and/or an automation system, in accordance with various aspects of this disclosure.

FIG. 4 shows exemplary methods 400 and systems in accordance with some embodiments. In some embodiments, a method incorporating the present systems and methods may include receiving linking information from a first device by a second device, linking the second device with the first device via a first connection, the linking based at least in part on the linking information, storing at least a portion of the linking information, and/or transmitting the stored linking information from the second device to one or more other devices via a second connection—as shown in blocks 405, 410, 415, and 420. In some embodiments, any and/or all of these operations may be performed by or at any system components and/or elements.

In some embodiments, at least one of a first connection and a second connection may include a protected signal connection. This protected signal may include having sufficient protection such that others may not discover the units and/or the connection without having at least one of a link key and one or more MAC addresses. For example, in some embodiments, the second connection may include an encrypted signal, a signal requiring authentication, and/or some combination.

Figure 5:
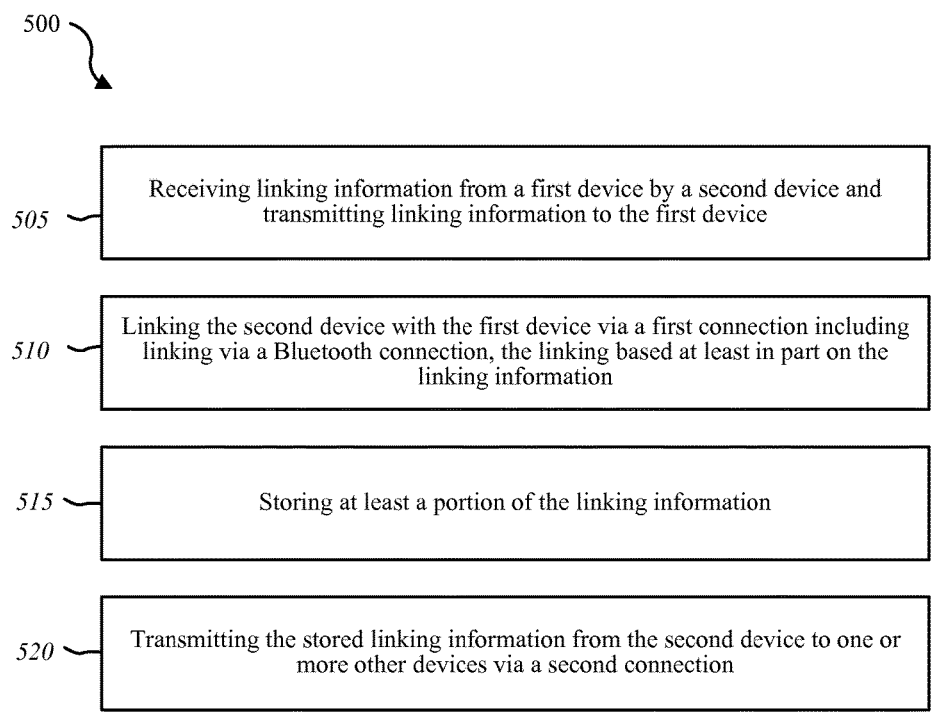
FIG. 5 is a flow chart illustrating an example of a method relating to a security and/or an automation system, in accordance with various aspects of this disclosure.

FIG. 5 shows exemplary methods 500 and systems in accordance with some embodiments. In some embodiments, a method incorporating the present systems and methods may include receiving linking information from a first device by a second device and transmitting linking information to the first device, linking the second device with the first device via a first connection including linking via a Bluetooth connection, the linking based at least in part on the linking information, storing at least a portion of the linking information, and/or transmitting the stored linking information from the second device to one or more other devices via a second connection—as shown in blocks 505, 510, 515, and 520. In some embodiments, any and/or all of these operations may be performed by or at any system components and/or elements.

Figure 6:
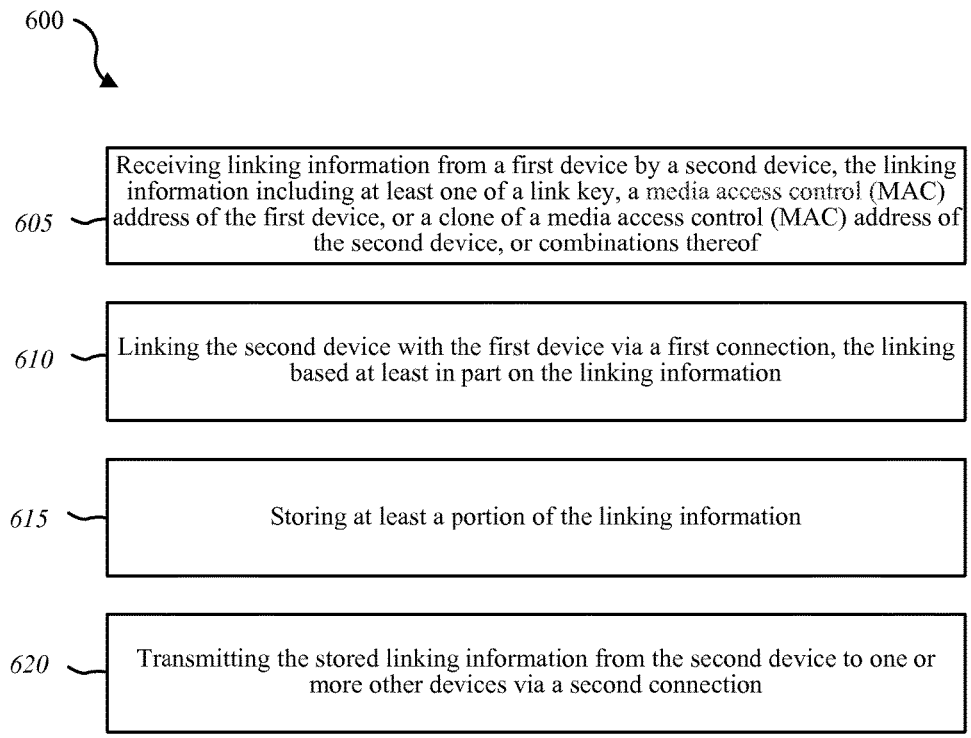
FIG. 6 is a flow chart illustrating an example of a method relating to a security and/or an automation system, in accordance with various aspects of this disclosure.

FIG. 6 shows exemplary methods 600 and systems in accordance with some embodiments. In some embodiments, a method incorporating the present systems and methods may include receiving linking information from a first device by a second device, the linking information including at least one of a link key, a media access control (MAC) address of the first device, and/or a clone of a media access control (MAC) address of the second device, and/or combinations thereof, linking the second device with the first device via a first connection, the linking based at least in part on the linking information, storing at least a portion of the linking information, and/or transmitting the stored linking information from the second device to one or more other devices via a second connection—as shown in blocks 605, 610, 615, and 620. In some embodiments, any and/or all of these operations may be performed by or at any system components and/or elements.

Figure 7:
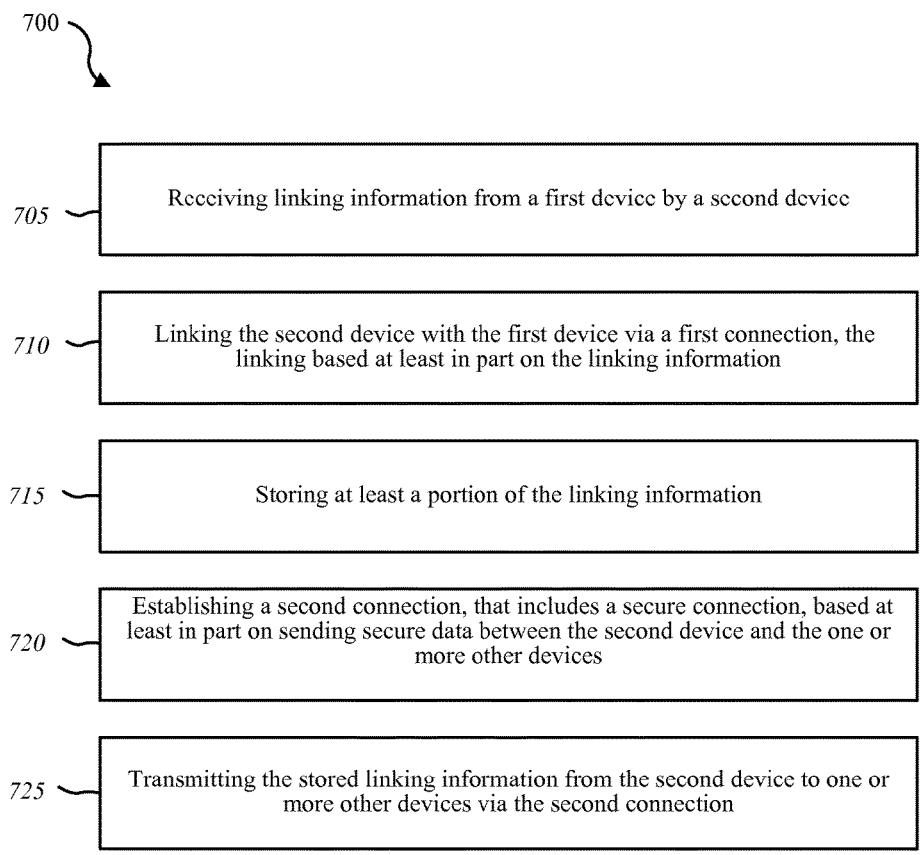
FIG. 7 is a flow chart illustrating an example of a method relating to a security and/or an automation system, in accordance with various aspects of this disclosure.

FIG. 7 shows exemplary methods 700 and systems in accordance with some embodiments. In some embodiments, a method incorporating the present systems and methods may include receiving linking information from a first device by a second device, linking the second device with the first device via a first connection, the linking based at least in part on the linking information, storing at least a portion of the linking information, establishing a second connection, that includes a secure connection, based at least in part on sending secure data between the second device and the one or more other devices, and/or transmitting the stored linking information from the second device to one or more other devices via the second connection—as shown in blocks 705, 710, 715, 720, and/or 725. In some embodiments, any and/or all of these operations may be performed by or at any system components and/or elements.

Figure 8:
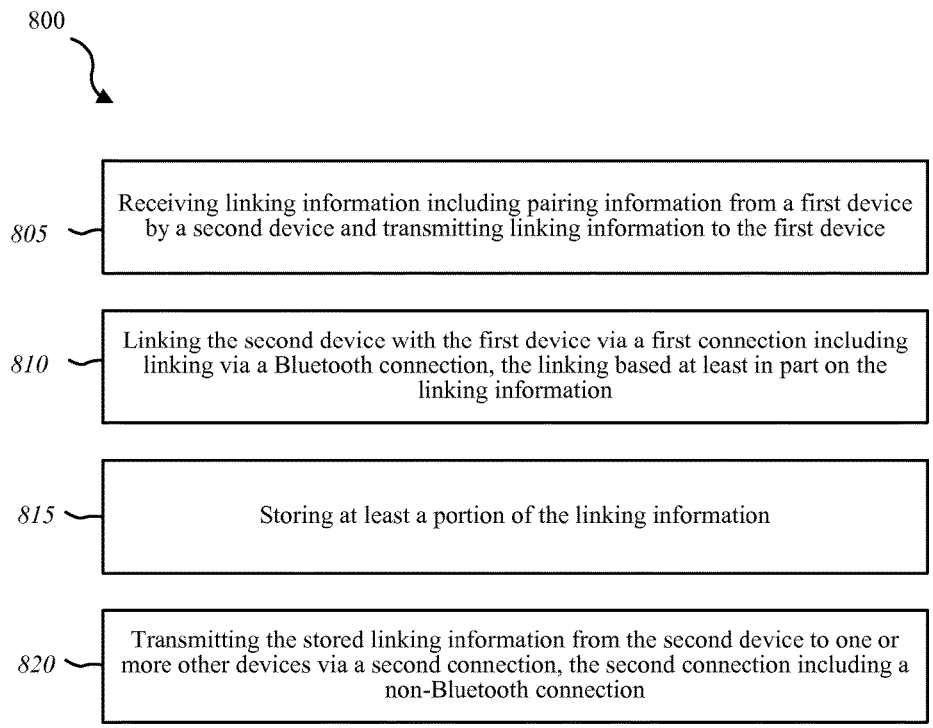
FIG. 8 is a flow chart illustrating an example of a method relating to a security and/or an automation system, in accordance with various aspects of this disclosure.

FIG. 8 shows exemplary methods 800 and systems in accordance with some embodiments. In some embodiments, a method incorporating the present systems and methods may include receiving linking information including pairing information from a first device by a second device and transmitting linking information to the first device, linking the second device with the first device via a first connection including linking via a Bluetooth connection, the linking based at least in part on the linking information, storing at least a portion of the linking information, and/or transmitting the stored linking information from the second device to one or more other devices via a second connection, the second connection including a non-Bluetooth connection—as shown in blocks 805, 810, 815, and 820. In some embodiments, any and/or all of these operations may be performed by or at any system components and/or elements.

Figure 9:
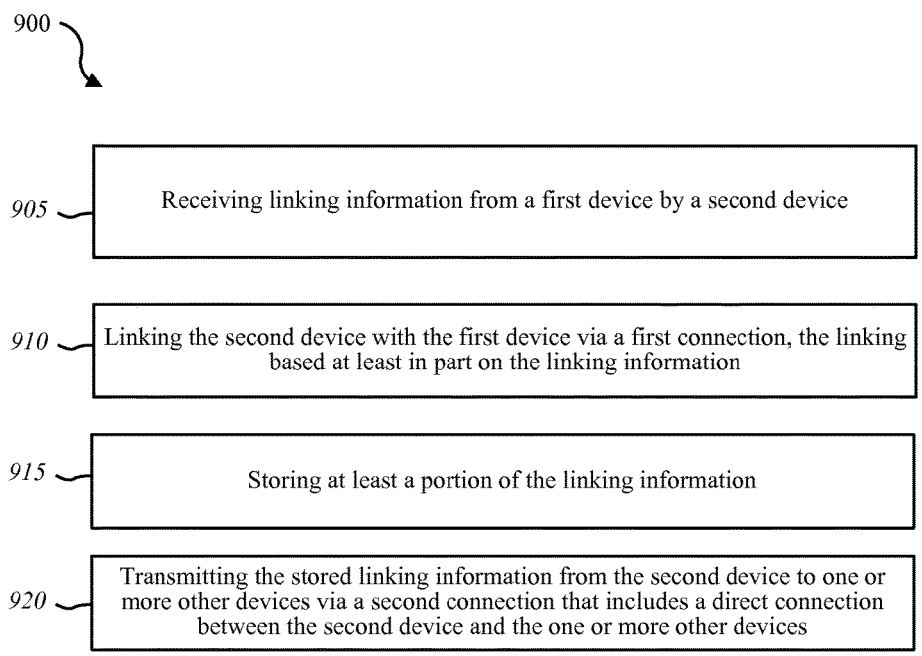
FIG. 9 is a flow chart illustrating an example of a method relating to a security and/or an automation system, in accordance with various aspects of this disclosure.

FIG. 9 shows exemplary methods 900 and systems in accordance with some embodiments. In some embodiments, a method incorporating the present systems and methods may include receiving linking information from a first device by a second device, linking the second device with the first device via a first connection, the linking based at least in part on the linking information, storing at least a portion of the linking information, and/or transmitting the stored linking information from the second device to one or more other devices via a second connection that includes a direct connection between the second device and the one or more other devices—as shown in blocks 905, 910, 915, and 920. In some embodiments, any and/or all of these operations may be performed by or at any system components and/or elements.

In some examples, aspects from two or more of the methods 400-900 may be combined and/or separated. It should be noted that methods 400, 500, 600, 700, 800, 900, etc. are just example implementations, and that the operations of the methods 400-900 may be rearranged or otherwise modified such that other implementations are possible.

Figure 10:
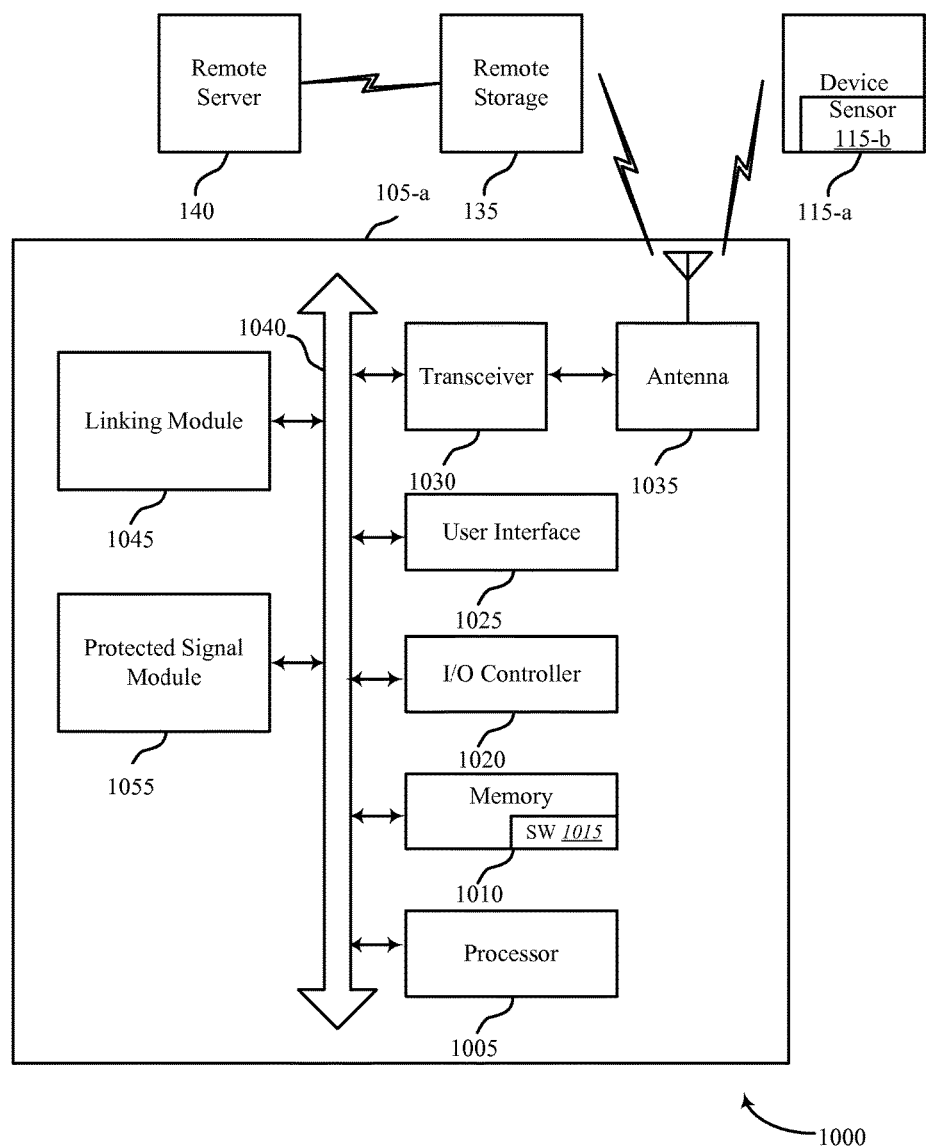
FIG. 10 shows a block diagram relating to a security and/or an automation system, in accordance with various aspects of this disclosure.

FIG. 10 shows a system 1000 for use in signal cloning systems, in accordance with various examples. System 1000 may include a second unit 105-a, which may be an example of the second unit 105 of FIG. 1. Second unit 105-a may also be an example of one or more aspects of second unit 205 and/or 1205 of FIGS. 2 and 12. In some embodiments, second unit 105-a may include a security and/or a home automation system control panel. In some embodiments, the terms a control panel and a control device may be used synonymously.

Second unit 105-*a* may include linking module 1045, which may be an example of linking module 137, 145, 159, and/or 1215 described with reference to FIGS. 1, 2, 12 and/or others. Second unit 105-*a* may also include protected signal module 1055, which may be an example of protected signal modules 139, 147, and/or 161 described with reference to FIGS. 1, 2, and/or others.

Second unit 105-*a* may also include components for bi-directional communications including components for transmitting communications and/or components for receiving communications. For example, second unit 105-*a* may communicate bi-directionally with one or more of device 115-*a*, one or more sensors 115-*b*, remote storage 135, and/or remote server 140. This bi-directional communication may be direct (e.g., second unit 105-*a* communicating directly with remote storage 135) or indirect (e.g., second unit 105-*a* communicating indirectly with remote server 140 through remote storage 135).

Linking module 1045 may facilitate linking and/or communication between one or more components and/or elements of a system, including second unit 105-*a* based at least in part on one or more parameters related to a communication signal and/or connection between a first unit (e.g., first unit 110) and a second unit (e.g., second unit 105) as described above with reference to FIGS. 1, 2, and/or others. For example, second unit 105-*a* may communicate information to one or more other devices to facilitate communication between the one or more other devices and a first unit (e.g., first unit 110) and/or a second unit 105-*a*. In some embodiments, this information may include a key, a MAC address (e.g., of a first device), and/or a clone of a MAC address (e.g., of a second device). By providing at least some of the cloned information, the other devices may be able to communicate with a first device, a second device, and/or between multiple other devices.

The protected signal module 1055 may facilitate secure linking and/or communication between one or more components and/or elements of a system, including second unit 105-*a* based at least in part on one or more parameters related to a communication signal and/or connection. In some embodiments, protected signal module 1055 may at least in part help establish a secure communication signal between second unit 105-*a* and one or more other units. For example, if first unit 110 and second unit 105-*a* communicate based on a Bluetooth signal, protected signal module 1055 may at least in part help establish a secure communication signal between second unit 105-*a* and third unit 120, among others. In some embodiments, establishing a secure, protected communication signal may include requiring authentication, decryption, and/or other related methods related to short range wireless communications.

Second unit 105-*a* may also include a processor module 1005, and memory 1010 (including software (SW)) 1015, an input/output controller module 1020, a user interface module 1025, a transceiver module 1030, and one or more antennas 1035 each of which may communicate—directly or indirectly—with one another (e.g., via one or more buses 1040). The transceiver module 1030 may communicate bi-directionally—via the one or more antennas 1035, wired links, and/or wireless links—with one or more networks or remote devices as described above. For example, the transceiver module 1030 may communicate bi-directionally with one or more of device 115-*a*, remote storage 135, and/or remote server 140.

The transceiver module 1030 may include a modem to modulate the packets and provide the modulated packets to the one or more antennas 1035 for transmission, and to demodulate packets received from the one or more antenna 1035. In some embodiments, while a control panel or a control device (e.g., second unit 105-*a*) may include a single antenna 1035, the control panel or the control device may also have multiple antennas 1035 capable of concurrently transmitting or receiving multiple wired and/or wireless transmissions. In some embodiments, one element of second unit 105-*a* (e.g., one or more antennas 1035, transceiver module 1030, etc.) may provide a direct connection to a remote server 140 via a direct network link to the Internet via a POP (point of presence). In some embodiments, one element of second unit 105-*a* (e.g., one or more antennas 1035, transceiver module 1030, etc.) may provide a connection using wireless techniques, including digital cellular telephone connection, Cellular Digital Packet Data (CDPD) connection, digital satellite data connection, and/or another connection.

The signals associated with system 1000 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 1035 and/or transceiver module 1030 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments, each antenna 1035 may receive signals or information specific and/or exclusive to itself. In other embodiments each antenna 1035 may receive signals or information not specific nor exclusive to itself.

In some embodiments, one or more sensors 115-*b* (e.g., motion, proximity sensor, smoke, glass break, door, window, carbon monoxide, and/or another sensor) may connect to some element of system 1000 via a network using one or more wired and/or wireless connections.

In some embodiments, the user interface module 1025 may include an audio device, such as an external speaker system, an external display device such as a display screen, and/or an input device (e.g., remote control device interfaced with the user interface module 1025 directly and/or through I/O controller module 1020).

One or more buses 1040 may facilitate data communication between one or more elements of second unit 105-*a* (e.g., processor module 1005, memory 1010, I/O controller module 1020, user interface module 1025, etc.).

Memory 1010 may include random access memory (RAM), read only memory (ROM), flash RAM, and/or other types. Memory 1010 may store computer-readable, computer-executable software/firmware code 1015 including instructions that, when executed, cause the processor module 1005 to perform various functions described in this disclosure (e.g., receiving linking information, linking one or more units, storing information such as the linking information, transmitting stored information, etc.). Alternatively, the software/firmware code 1015 may not be directly executable by the processor module 1005 but may cause a computer (e.g., when compiled and executed) to perform functions described herein.

In some embodiments, processor module 1005 may include, among other things, an intelligent hardware device (e.g., a central processing unit (CPU), a microcontroller, and/or an ASIC, etc.). Memory 1010 can contain, among other things, the Basic Input-Output system (BIOS) which may control basic hardware and/or software operation such as the interaction with peripheral components or devices. For example, linking module 1045 and/or protected signal module 1055 to implement the present systems and methods may be stored within system memory 1010. Applications resident with system 1000 are generally stored on and accessed via a non-transitory computer readable medium, such as a hard disk drive and/or other storage medium. Additionally, applications can be in the form of electronic signals modulated in accordance with the application and data communication technology when accessed via a network interface (e.g., transceiver module 1030, one or more antennas 1035, etc.).

Many other devices and/or subsystems may be connected to one or may be included as one or more elements of system 1000 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 10 need not be present to practice the present systems and methods. The devices and subsystems can be interconnected in different ways from that shown in FIG. 10. In some embodiments, an aspect of some operation of a system, such as that shown in FIG. 10, may be readily known in the art and are not discussed in detail in this application. Code to implement the present disclosure can be stored in a non-transitory computer-readable medium such as one or more of system memory 1010 or other memory. The operating system provided on I/O controller module 1020 may be iOS®, ANDROID®, MS-dOS®, MS-WINDOWS®, OS/2®, UNIX®, LINUX®, or another known operating system.

The transceiver module 1030 may include a modem configured to modulate the packets and provide the modulated packets to the antennas 1035 for transmission and/or to demodulate packets received from the antennas 1035. While the devices 115-*a* may include a single antenna 1035, the devices 115-*a* may have multiple antennas 1035 capable of concurrently transmitting and/or receiving multiple wireless transmissions.

Figure 11:
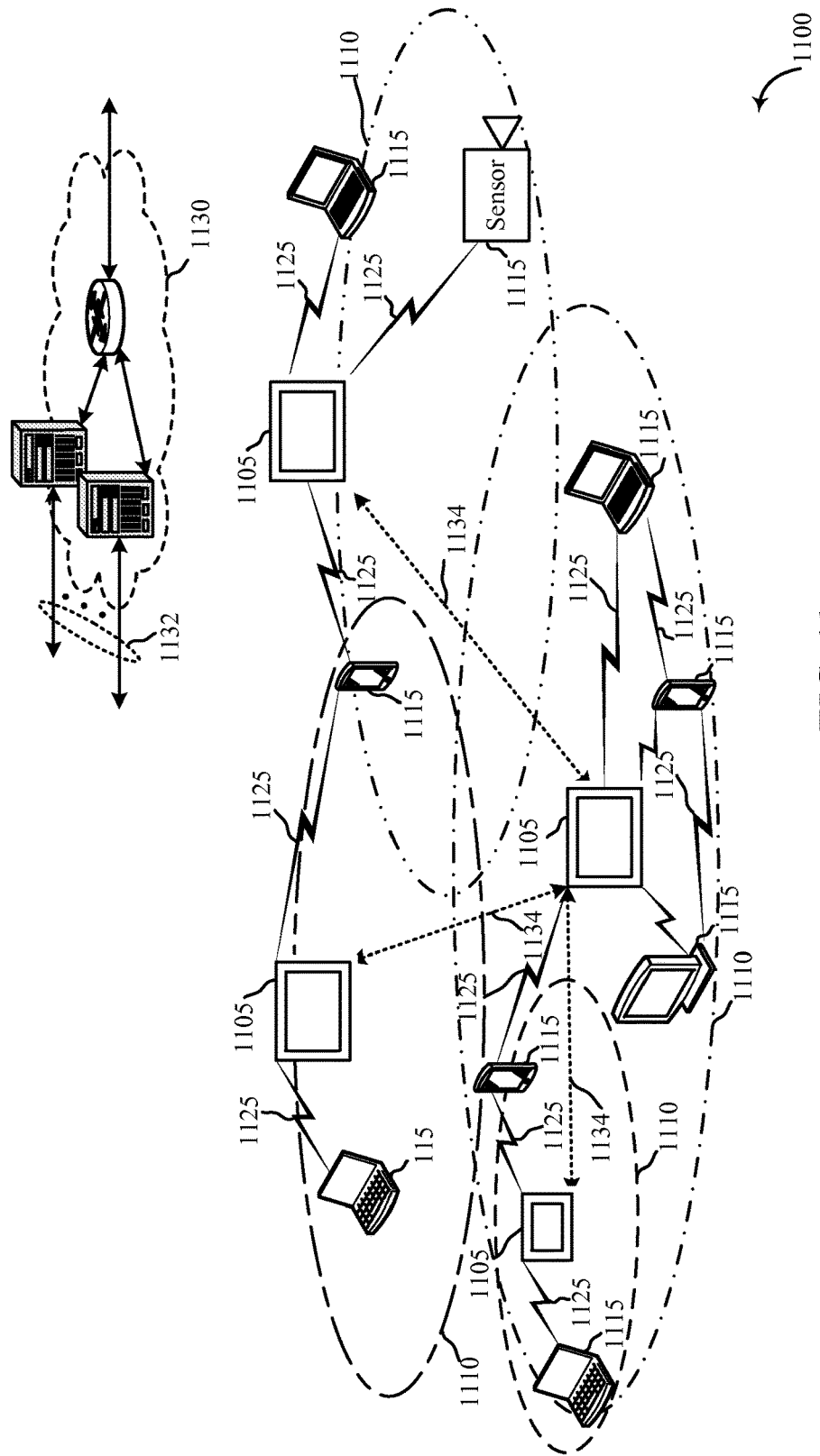
FIG. 11 shows a block diagram relating to a security and/or an automation system, in accordance with various aspects of this disclosure.

FIG. 11 illustrates an example of a communications system 1100 in accordance with various aspects of the disclosure. The communications system 1100 may include second devices 1105, devices 1115, and/or a network 1130.

The network 1130 may provide user authentication, encryption, access authorization, tracking, Internet Protocol (IP) connectivity, and other access, calculation, modification, and/or functions. The second devices 1105 may interface with the network 1130 through wired and/or wireless communication links 1132 and may perform communication configuration, adjustment, and/or scheduling for communication with the devices 1115, or may operate under the control of a controller. In various examples, the second devices 1105 may communicate—either directly or indirectly (e.g., through network 1130)—with each other over wired and/or wireless communication links 1134. Second devices 1105 may communicate with a back end server—directly and/or indirectly—using one or more communication links.

The second devices 1105 may wirelessly communicate with the devices 1115 via one or more antennas. Each of the second devices 1105 may provide communication coverage for a respective geographic coverage area 1110. In some examples, second devices 1105 may be referred to as a control device, a base transceiver station, a radio base station, an access point, a radio transceiver, and/or some other suitable terminology. The geographic coverage area 1110 for a second devices 1105 may be divided into sectors making up only a portion of the coverage area. The communications system 1100 may include second devices 1105 of different types. There may be overlapping geographic coverage areas 1110 for one or more different parameters, including different technologies, features, subscriber preferences, hardware, software, technology, and/or methods. For example, each second device 1105 may be related to one or more discrete structures (e.g., a home, a business) and each of the one more discrete structures may be related to one or more discrete areas. In other examples, multiple second devices 1105 may be related to the same one or more discrete structures (e.g., multiple control panels relating to a home and/or a business complex).

The devices 1115 are dispersed throughout the communications system 1100 and each device 1115 may be stationary and/or mobile. A device 1115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like.

A device 1115 may also include or be referred to by those skilled in the art as a user device, a sensor, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

A device 1115 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. A device 115 may be able to communicate through one or more wired and/or wireless connections with various components such as control panels, base stations, and/or network equipment (e.g., servers, wireless communication points, etc.) and/or the like.

The communication links 1125 shown in communications system 1100 may include uplink (UL) transmissions from a device 1115 to a second device 1105, and/or downlink (DL) transmissions, from a second devices 1105 to a device 1115. The downlink transmissions may also be called forward link transmissions while the uplink transmissions may also be called reverse link transmissions. Each communication link 1125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 1125 may transmit bidirectional communications and/or unidirectional communications. Communication links 1125 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to security and/or automation systems.

In some embodiments of communications system 1100, second devices 1105 and/or devices 1115 may include one or more antennas for employing antenna diversity schemes to improve communication quality and reliability between second devices 1105 and devices 1115. Additionally or alternatively, second devices 1105 and/or devices 1115 may employ multiple-input, multiple-output (MIMO) techniques that may take advantage of multi-path, mesh-type environments to transmit multiple spatial layers carrying the same or different coded data.

While the devices 1115 may communicate with each other through the second devices 1105 using communication links 1125, each device 1115 may also communicate directly with one or more other devices via one or more direct communication links 1134. Two or more devices 1115 may communicate via a direct communication link 1134 when both devices 1115 are in the geographic coverage area 1110 or when one or neither devices 1115 is within the geographic coverage area 1110. Examples of direct communication links 1134 may include Wi-Fi Direct, Bluetooth, wired, and/or, and other P2P group connections. The devices 1115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 1100.

Figure 12:
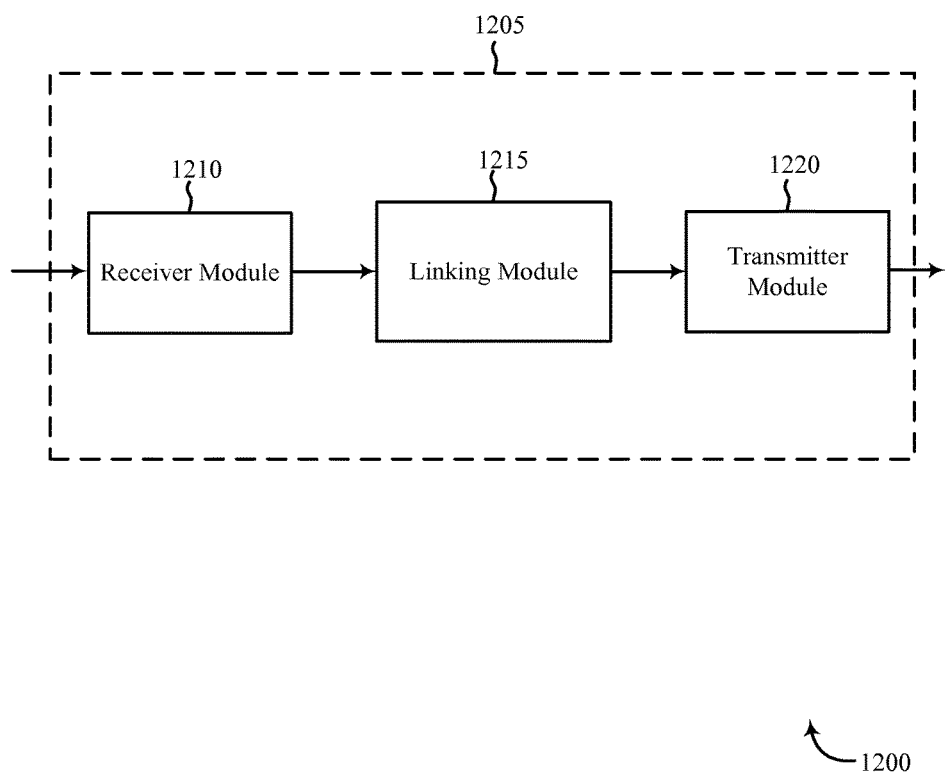
FIG. 12 shows a block diagram of devices relating to a security and/or an automation system, in accordance with various aspects of this disclosure.

FIG. 12 shows a block diagram 1200 of a second device 1205 for use in electronic communication, in accordance with various aspects of this disclosure. The second device 1205 may be an example of one or more aspects of a second unit 105 described with reference to FIGS. 1, 2, 10, and/or others. The second device 1205 may include a receiver module 1210, a linking module 1215, and/or a transmitter module 1220. The second device 1205 may also be or include a processor. Each of these modules may be in communication with each other—directly and/or indirectly.

The components of the second device 1205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 1210 may receive information such as packets, user data, and/or control information associated with various information channels (e.g., control channels, data channels, etc.). The receiver module 1210 may be configured to receive information relating to one or more signals, connections, and/or communications relating to one or more devices, among other things. Information may be passed on to the linking module 1215, and/or to other components of the second device 1205.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
   receiving, via a wireless communication protocol, linking information associated with a first wireless device from the first wireless device at a second wireless device;
   linking the second wireless device with the first wireless device via a first connection, the linking based at least in part on the linking information;
   storing at least a portion of the linking information associated with the first wireless device;
   transmitting, via the wireless communication protocol, the stored linking information and linking information associated with the second wireless device from the second wireless device to the one or more other wireless devices via a second connection, wherein the linking information associated with the second wireless device is indicative of an identity of the second wireless device; and
   identifying a connection between at least one of the one or more other wireless devices and the first wireless device that is based at least in part on the transmitted stored linking information and the transmitted linking information associated with the second wireless device.

2. The method of claim 1, further comprising:
   transmitting the linking information associated with the second wireless device to the first wireless device.

3. The method of claim 1, wherein the first wireless device comprises:
   a mobile phone, a portable electronic device securable to a user or a user's clothing, or a key fob.

4. The method of claim 1, wherein linking the second wireless device with the first wireless device via the first connection comprises:
   linking via a Bluetooth connection.

5. The method of claim 1, wherein the linking information associated with the first wireless device comprises:
   pairing information.

6. The method of claim 5, wherein the pairing information comprises:
   at least one of legacy pairing information, or secure simple pairing information, or combinations thereof.

7. The method of claim 1, further comprising:
   linking the first wireless device directly to each of the one or more other wireless devices based at least in part on the transmitting the stored linking information.

8. The method of claim 1, wherein the linking information comprises:
   at least one of a link key, or a media access control (MAC) address of the first wireless device, or combinations thereof.

9. The method of claim 1, further comprising:
   establishing the second connection, wherein the second connection comprises:
   a secure connection.

10. The method of claim 9,
wherein establishing the second connection comprises sending secure data between the second wireless device and the one or more other devices,
wherein the secure data comprises at least one of a key and a secret.

11. The method of claim 1, wherein the second connection comprises:
a wired connection.

12. The method of claim 1, wherein the second connection comprises a non-Bluetooth connection.

13. The method of claim 1, wherein receiving the linking information associated with the first wireless device from the first wireless device by the second wireless device comprises:
receiving a user input from the first wireless device by the second wireless device.

14. The method of claim 13, wherein the user input comprises:
at least one of a pin and a password.

15. The method of claim 1, wherein the second connection comprises:
a direct connection between the second wireless device and the one or more other wireless devices.

16. The method of claim 1, wherein the second connection comprises:
a network connection between the second wireless device and the one or more other wireless devices.

17. The method of claim 1, wherein the second wireless device comprises:
a system panel.

18. An apparatus for security and/or automation systems, comprising:
a second wireless device to communicate, via a wireless communication protocol, with a first wireless device via a first connection;
the second wireless device to communicate, via the wireless communication protocol, with one or more other wireless devices via a second connection;
a processor;
memory in electronic communication with the processor; and
instructions stored in the memory, the instructions being executable by the processor to:
receive linking information associated with the first wireless device from the first wireless device by the second wireless device;
link the second wireless device with the first wireless device via the first connection, the linking based at least in part on the linking information;
store at least a portion of the linking information associated with the first wireless device;
transmit, via the wireless communication protocol, the stored linking information and linking information associated with the second wireless device from the second wireless device to the one or more other wireless devices via the second connection; wherein the linking information associated with the second wireless device is indicative of an identity of the second wireless device; and
identify a connection between at least one of the one or more other wireless devices and the first wireless device that is based at least in part on the transmitted stored linking information and the transmitted linking information associated with the second wireless device.

19. The apparatus of claim 18,
wherein the second wireless device may comprise a security system panel, and
wherein the first wireless device comprises a mobile phone, a portable electronic device securable to a user or a user's clothing, or a key fob.

20. A non-transitory computer-readable storage medium storing computer executable code for security and/or automation systems, the code executable by a processor to:
receive linking information associated with a first wireless device, via a wireless communication protocol, from the first wireless device at a second wireless device;
link the second wireless device with the first wireless device via a first connection, the linking based at least in part on the linking information associated with the first wireless device;
store at least a portion of the linking information associated with the first wireless device;
transmit, via the wireless communication protocol, the stored linking information and linking information associated with the second wireless device from the second wireless device to one or more other wireless devices via a second connection; wherein the linking information associated with the second wireless device is indicative of an identity of the second wireless device; and
identify a connection between at least one of the one or more other wireless devices and the first wireless device that is based at least in part on the transmitted stored linking information and the transmitted linking information associated with the second wireless device.

* * * * *